(12) United States Patent  (10) Patent No.: US 6,523,771 B2
Sumiyashiki                  (45) Date of Patent:     Feb. 25, 2003

(54) WEBBING RETRACTOR

(75) Inventor: Akira Sumiyashiki, Niwa-gun (JP)

(73) Assignee: Kabushiki Kaisha Tokai-Rika-Denki Seisakusho, Aichi-ken (JP)

( * ) Notice: Subject to any disclaimer, the term of this patent is extended or adjusted under 35 U.S.C. 154(b) by 22 days.

(21) Appl. No.: 09/900,454

(22) Filed: Jul. 9, 2001

(65) Prior Publication Data
US 2002/0005449 A1 Jan. 17, 2002

(30) Foreign Application Priority Data
Jul. 11, 2000 (JP) ........................................ 2000-210533

(51) Int. Cl.⁷ .......................... B60R 22/38; B60R 22/40
(52) U.S. Cl. .............................. 242/383.2; 242/383.5; 242/384.6; 280/806; 297/479
(58) Field of Search ........................... 242/383.2, 383.5, 242/384.6; 280/806; 297/479

(56) References Cited
U.S. PATENT DOCUMENTS

| 5,390,873 | A | * | 2/1995 | Fujimura et al. | ........ 242/383.2 |
| 5,480,105 | A | * | 1/1996 | Fujimura et al. | ........ 242/383.2 |
| 5,484,118 | A | * | 1/1996 | Fujimura et al. | ........ 242/384.2 |
| 5,921,496 | A | * | 7/1999 | Matsuki et al. | .......... 242/383.2 |
| 6,068,208 | A | * | 5/2000 | Matsuki et al. | .......... 242/383.2 |
| 2002/0008171 | A1 | * | 1/2002 | Sumiyashiki et al. | .... 242/383.2 |

* cited by examiner

*Primary Examiner*—Kathy Matecki
*Assistant Examiner*—Minh-Chau Pham
(74) *Attorney, Agent, or Firm*—Nixon Peabody LLP; Thomas W. Cole

(57) ABSTRACT

In a webbing retractor, when a pawl engages with an internal tooth, a lock plate is guided, via a V gear, to a position at which engagement with a ratchet tooth is possible, and thereafter, the lock plate self-locks. When the V gear reversely rotates by a predetermined amount in accordance with this self-locking, engagement of the pawl and the internal tooth is cancelled. An engagement surface of the internal tooth corresponds to a locus of swinging of the pawl. Engagement with the pawl is cancelled at a smallest V gear reverse rotation angle.

20 Claims, 10 Drawing Sheets

WEBBING RETRACTOR

BACKGROUND OF THE INVENTION

1. Field of the Invention

The present invention relates to a webbing retractor which can impede pulling-out of a webbing at a time when a vehicle rapidly decelerates or the like, and in particular, to a webbing retractor which, after impeding pulling-out of a webbing, enables the webbing to be pulled out again.

2. Description of the Related Art

Generally, in a webbing retractor, a webbing is wound in a roll form on a hollow cylindrical spool supported at a frame which is formed in a substantial U-shape as seen in plan view and which is fixed to a vehicle. Usually, the webbing can be freely taken-up or pulled-out due to the spool rotating freely. Further, in the webbing retractor, a WSIR (webbing sensitive inertia reel) or a VSIR (vehicle sensitive inertia reel) is utilized in order to impede pulling-out of the webbing when a rapid deceleration of the vehicle or a rapid pulling-out of the webbing is sensed.

Hereinafter, a conventional webbing retractor equipped with a WSIR and a VSIR will be described on the basis of FIGS. 10A and 10B.

In FIGS. 10A and 10B, a webbing retractor 100 is shown in a side view seen from a rotational axis direction of a spool 102. The webbing retractor 100 is formed to include the spool 102; a lock plate 104 which is supported at the spool 102 so as to be freely swingable and which can mesh with ratchet teeth 106 provided at a frame (not shown); a V gear 108 which is provided coaxially with the spool 102, and when relative rotation with respect to the spool 102 arises, the V gear 108 guides the lock plate 104 to a position at which engagement with the ratchet teeth 106 is possible; a W sensor portion 110 which forms the WSIR; and a V sensor portion 120 which forms the VSIR.

In this webbing retractor 100, usually, the spool 102 and the V gear 108 rotate integrally. Thus, the webbing can be freely taken-up and pulled-out (the state shown in FIG. 10A) without the lock plate 104 engaging the ratchet teeth 106.

On the other hand, when the webbing is pulled-out rapidly, an inertia plate 116 of the W sensor portion 110 cannot follow the rotation of the V gear 108 (the spool 102) in the webbing pull-out direction (direction A in FIGS. 10A and 10B), and an inertial delay arises. As a result, relative rotation in the webbing take-up direction arises between the inertia plate 116 and the V gear 108. A pawl 112 which abuts the inertia plate 116 is swung in the webbing take-up direction and engages with internal teeth 118 fixed to the frame, and rotation of the V gear 108 in the webbing pull-out direction is impeded (the state shown in FIG. 10B).

Here, an engagement surface 118a of the internal tooth 118, which engagement surface 118a engages with the pawl 112, stands substantially perpendicular with respect to direction A. As a result, the tooth tip of the pawl 112 which engages with the engagement surface 118a is reliably guided to the tooth bottom of the internal tooth 118. A phase offset by which the pawl 112 is guided to the next internal tooth 118 and which is due to deficient engagement, and damage to the W sensor portion 110 accompanying such phase offset, are prevented.

When the rotation of the V gear 108 in the webbing pull-out direction is impeded, relative rotation is generated between the V gear 108 and the spool 102 which continues to rotate along with the pulling-out of the webbing. As a result, the lock plate 104, which has a guide pin 104a which is inserted into a guide hole 108a formed in the V gear 108, does not follow the rotation of the spool 102, and is guided by the guide hole 108a via the guide pin 104a, and reaches a position at which engagement with the ratchet tooth 106 is possible (a position at which the lock plate 104 and the tooth tip of the ratchet tooth 106 engage). The lock plate 104, which has been guided to the position at which engagement with the ratchet tooth 106 is possible, is guided to the tooth bottom of the ratchet tooth 106 by the configuration of the ratchet tooth 106, and is set in a locked state. In other words, the lock plate 104 is self-locked, and rotation of the spool 102 in the webbing pull-out direction is impeded.

At the time of this self-locking, the lock plate 104 moves toward the tooth bottom of the ratchet tooth 106 (i.e., toward the left in FIGS. 10A and 10B). Accompanying this movement of the lock plate 104, the guide pin 104a pushes the guide hole 108a side wall of the V gear 108 toward the left in FIG. 10, and due to this pushing moment, the V gear 108 rotates in the webbing take-up direction (direction B in FIGS. 10A and 10B). When the V gear 108 rotates by a predetermined amount in direction B, the engagement of the pawl 112 and the internal tooth 118 is cancelled. The pawl 112, which is urged to swing in direction A by being connected to one end of a spring 114 whose other end is fixed to the V gear 108, returns to its original position. In other words, the operation of the W sensor portion 110 is cancelled.

In this way, in the process in which the pulling-out of the webbing is impeded, operation of the W sensor portion 110 is cancelled. As a result, thereafter, pulling-out of the webbing is again possible.

In order to cancel the operation of the W sensor portion 110, a W sensor cancel angle α shown in FIG. 10B must be smaller than the angle of rotation in direction B of the V gear 108 (hereinafter called the V gear reverse rotation angle). The W sensor cancel angle α is an angle necessary for a peak portion C of the internal tooth 118, with which the pawl 112 is engaged, to move relatively with respect to the V gear 108 (the pawl 102) to an intersection point D of a swinging locus a of the tooth tip of the pawl 112 and a moving locus b of the peak portion of the internal tooth 118 (i.e., an angle necessary for the peak portion C to move relatively to a position at which no internal tooth 118 exists on the locus of swinging of the tooth tip of the pawl 112). Further, although not illustrated, after the V sensor portion 120 operates, even at the time when engagement of a sensor lever 122 and an external tooth 108b formed at the outer peripheral surface of the V gear 108 is released, the V sensor cancel angle must be smaller than the V gear reverse rotation angle.

However, at the conventional webbing retractor 100 such as described above, in order to prevent a phase offset at the time of operation of the W sensor portion 110, the engagement surface 118a of the internal tooth 118 must stand substantially perpendicular with respect to direction A, and the sensor cancel angle α cannot be made smaller by any more than a predetermined value. Further, there is dispersion in the dimensions of the internal teeth 118 within the predetermined range of dimensional accuracy, and due to this dispersion in dimensions, the values of the W sensor cancel angles α are not constant (the values of the W sensor cancel angles α vary depending on which internal tooth 118 the pawl 12 is engaged with). Further, the value of the W sensor cancel angle α also depends on the accuracy of assembly of the respective parts.

Thus, depending on the position of the internal tooth 118 with which the pawl 112 is engaged, there are cases in which the sensor cancel angle α is greater than the V gear reverse rotation angle and the operation of the W sensor portion 110 cannot be cancelled. Further, in order to make the maximum value of the W sensor cancel angle α always smaller than the V gear reverse rotation angle, excessive dimensional precision and assembly precision are required. Thus, a problem arises in that machinability and assemblability are poor, and costs increase. Further, there are of course similar problems with the V sensor portion 120 as well.

SUMMARY OF THE INVENTION

In view of the aforementioned, an object of the present invention is to provide a webbing retractor in which a webbing pull-out impeded state can be reliably cancelled without the need for excessive precision in the machining and assembly of parts, and in which, in predetermined cases, rotation of a spool in a webbing pull-out direction can be impeded without phase offset.

In order to achieve the above-described object, a webbing retractor of the present invention comprises: a spool which is tube-shaped and on which a webbing is taken-up and from which the webbing is pulled-out; a lock tooth formed at a surface, which intersects a rotation shaft of the spool, of a frame which is fixed and held at a vehicle and which rotatably supports both ends of the spool; a lock plate formed so as to be engageable with the lock tooth and connected to the spool so as to be freely swingable, and when the spool is rotated in a webbing pull-out direction from a position at which the lock plate can engage with the lock tooth, the lock plate is guided by the lock tooth and moved toward a tooth bottom of the lock tooth and engages with the lock tooth, such that the lock plate impedes rotation of the spool in the webbing pull-out direction; a lock wheel formed in a disc-shape and provided coaxially with the spool at one end side of the spool, the lock wheel usually rotating integrally with the spool and holding the lock plate at a position of non-engagement with the lock tooth, and when relative rotation arises between the lock wheel and the spool, the lock wheel guides the lock plate to a position at which engagement with the lock tooth is possible, and as the lock plate moves toward the tooth bottom of the lock tooth, the lock wheel is rotated in a webbing take-up direction; and a lock operation device having a pawl which is swingably supported and an engagement tooth which can engage with the pawl, the pawl usually being held at a position of non-engagement with the engagement tooth, and in a predetermined case, due to the pawl swinging and engaging with the engagement tooth, rotation of the lock wheel in the webbing pull-out direction is impeded, and due to the lock wheel being rotated in the webbing take-up direction, an engaged state of the pawl and the engagement tooth is cancelled, wherein an engagement surface of the engagement tooth, which engagement surface engages with the pawl, is formed in a circular arc shape corresponding to a locus of swinging of a region at which the pawl engages with the engagement tooth.

In the above-described webbing retractor, the spool, on which the webbing can be taken up and from which the webbing can be pulled-out, is supported so as to be freely rotatable. The lock plate is held by the lock wheel at a position of non-engagement with the lock tooth, and the pawl of the lock operation device is held at a position of non-engagement with the engagement tooth (the lock operation device is not operated). Thus, usually, the webbing can be freely taken-up and pulled-out.

In a predetermined case such as at the time the vehicle rapidly decelerates or at the time the webbing is rapidly pulled-out, when the lock operation device is operated, i.e., when the pawl engages with the engagement tooth, rotation of the lock wheel in the webbing pull-out direction is impeded. When rotation of the lock wheel in the webbing pull-out direction is impeded, relative rotation arises between the lock wheel and the spool from which the webbing is being pulled-out, and the lock plate is guided to a position at which engagement with the lock tooth provided at the frame is possible. As the spool rotates in the webbing pull-out direction, the lock plate, which is guided to the position where engagement with the lock tooth is possible, is guided by the lock tooth, and moves toward the tooth bottom of the lock tooth, and completely engages with the lock tooth (the lock plate and the lock tooth are self-locked). In this way, rotation of the spool in the webbing pull-out direction is impeded.

Further, at the time of the aforementioned self-locking, the lock wheel, which guides the lock plate to the position at which engagement with the lock tooth is possible, rotates in the webbing take-up direction as the lock plate moves toward the tooth bottom of the lock tooth. In this way, the engagement of the engagement tooth and the pawl of the lock operation device is cancelled (operation of the lock operation device is cancelled).

The engagement surface of the engagement tooth, which engagement surface engages with the pawl, is formed in a circular-arc shape in correspondence with the locus of swinging of the region at which the pawl engages with the engagement tooth (hereinafter, this region is called the pawl distal end). Therefore, when the lock operation device is operated, rotation of the lock wheel in the webbing pull-out direction is impeded without the pawl distal end being guided to the tooth bottom of the engagement tooth. Namely, regardless of what position of the engagement surface of the engagement tooth, which engagement surface engages with the pawl, the pawl distal end engages, the pawl is pushed and held at that engagement position. (For example, the pawl is pushed and held by the webbing tensile force which is slightly transmitted to the lock wheel via the rotation shaft of the spool or a spring for the lock wheel to maintain the lock plate at a position of non-engagement with the lock tooth at usual times.) Thus, rotation of the lock wheel in the webbing pull-out direction can be reliably impeded without a phase offset arising.

Further, the engagement surface of the engagement tooth, which engagement surface engages with the pawl, is formed in a circular-arc shape in correspondence with the locus of swinging of the pawl distal end. Thus, the angle needed for the operation of the lock operation device to be cancelled (hereinafter, the "sensor cancel angle") is a minimum value (substantially 0 [rad]). Namely, if the pawl and the engagement tooth are separated by an extremely small amount of an extent such that a pushing force, which is applied to the engagement portion of the pawl and the engagement tooth due to the webbing tensile force which is slightly transmitted to the lock wheel, is not applied to the pawl, the pawl can swing along the engagement surface of the engagement tooth which is formed in a circular-arc shape in correspondence with the locus of swinging of the pawl distal end. As a result, the pawl returns to its original position due to the force (e.g., the urging force of a spring) for maintaining the pawl at the position of non-engagement with the engagement tooth at ordinary times, and operation of the lock operation device is cancelled. In this way, a sufficiently small sensor cancel angle can be obtained by moderate machining precision and assembly precision of the engagement tooth. Thus, the operation of the lock operation device is reliably cancelled due to the rotation of the lock wheel in the webbing take-up direction, and after the pulling-out of the webbing is impeded, pulling-out of the webbing is again possible.

In this way, in the webbing retractor of the present invention, a webbing pull-out impeded state can be reliably cancelled without the need for excessive precision in the machining and assembly of parts, and, in predetermined cases, rotation of the spool in the webbing pull-out direction can be impeded without phase offset.

In the webbing retractor relating to the present invention, preferably, the engagement tooth of the lock operation device is formed at an inner peripheral surface of a tube-shaped member which is fixedly provided at the frame, and in a state in which the pawl of the lock operation device is accommodated within the tube-shaped member, the pawl is supported at the lock wheel so as to be freely swingable around a shaft which is parallel to the rotation shaft of the spool, and the pawl is connected to one end portion of an elastic body whose other end portion is connected to the lock wheel, and usually, the pawl is urged in a direction of non-engagement with the engagement tooth by urging force of the elastic body, and at a time when the webbing is rapidly pulled-out, the pawl swings in a direction of engaging with the engagement tooth against the urging force of the elastic body, and due to the lock wheel being rotated in the webbing take-up direction, the pawl separates from the engagement tooth and returns to a position of non-engagement with the engagement tooth due to the urging force of the elastic body.

In the webbing retractor of the present invention, it is preferable that, usually, the pawl is urged by urging force of an elastic body in a direction of non-engagement with the engagement tooth, and thus, the lock operation device does not operate.

When the webbing is pulled-out rapidly, the pawl, which is supported at the lock wheel, is swung in a direction of engaging with the engagement tooth (in the webbing take-up direction), relatively to the lock wheel, against the urging force of the elastic body. The pawl engages, without phase offset, with the engagement surface, which is formed in a circular-arc shape corresponding to the locus of swinging of the distal end of the pawl, of the engagement tooth which is formed at the inner surface of the tube-shaped member which is fixedly provided at the frame (i.e., the lock operation device is operated).

Further, when the lock wheel is rotated in the webbing take-up direction as the lock plate and the lock tooth self-lock, the pawl supported at the lock wheel separates from the engagement tooth, and, due to the urging force of the elastic body, returns to the position of non-engagement with the engagement tooth along the engagement surface which is formed in a circular-arc shape corresponding to the locus of swinging of the pawl distal end.

In this way, in the preferable webbing retractor of the present invention, a webbing pull-out impeded state can be reliably cancelled without the need for excessive precision in the machining and assembly of parts, and rotation of the spool in the webbing pull-out direction can be impeded without phase offset at the time when the webbing is rapidly pulled-out.

In the webbing retractor of the present invention, in the above-described webbing retractor, even more preferably, a region of engagement of the pawl with the engagement tooth is formed so as to correspond to a locus of swinging of the pawl.

In this webbing retractor, in the same way as the engagement surface of the engagement tooth, the engagement portion (pawl distal end) of the pawl, which engagement portion engages with the engagement tooth, corresponds to the locus of swinging of the pawl. Thus, in the state in which the pawl and the engagement tooth are engaged, there is planar contact, and rotation of the lock wheel in the webbing pull-out direction can be reliably impeded. Further, even if a portion of the pawl distal end and a portion of the engagement surface of the engagement tooth engage, rotation of the lock wheel in the webbing pull-out direction is impeded. For example, even at a position (swinging amplitude) at which engagement with the engagement tooth is impossible at a pawl whose distal end is acute, phase offset can be reliably prevented due to the pawl reliably engaging with the engagement tooth.

In this way, in the even more preferable webbing retractor, a webbing pull-out impeded state can be reliably cancelled without the need for excessive precision in the machining and assembly of parts, and, in predetermined cases, rotation of the spool in the webbing pull-out direction can be reliably impeded without phase offset.

10B is a side view showing an operating state of the W sensor forming the conventional webbing retractor.

DESCRIPTION OF THE PREFERRED EMBODIMENTS

A webbing retractor 10 relating to an embodiment of the present invention will be described on the basis of FIGS. 1 through 7.

Figure 1:
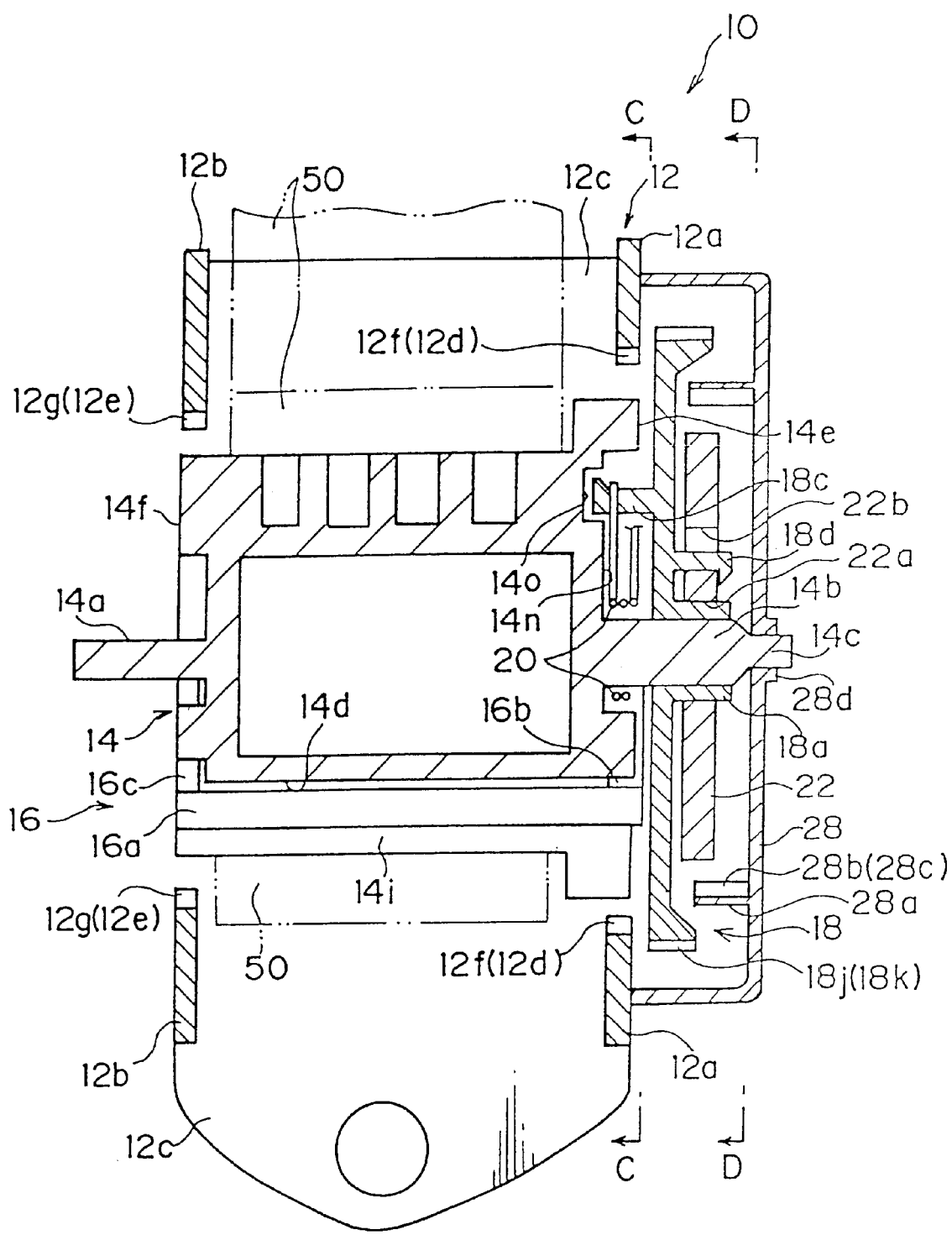
FIG. 1 is a schematic sectional view showing an overall structure of a webbing retractor relating to an embodiment of the present invention.
Figure 2:
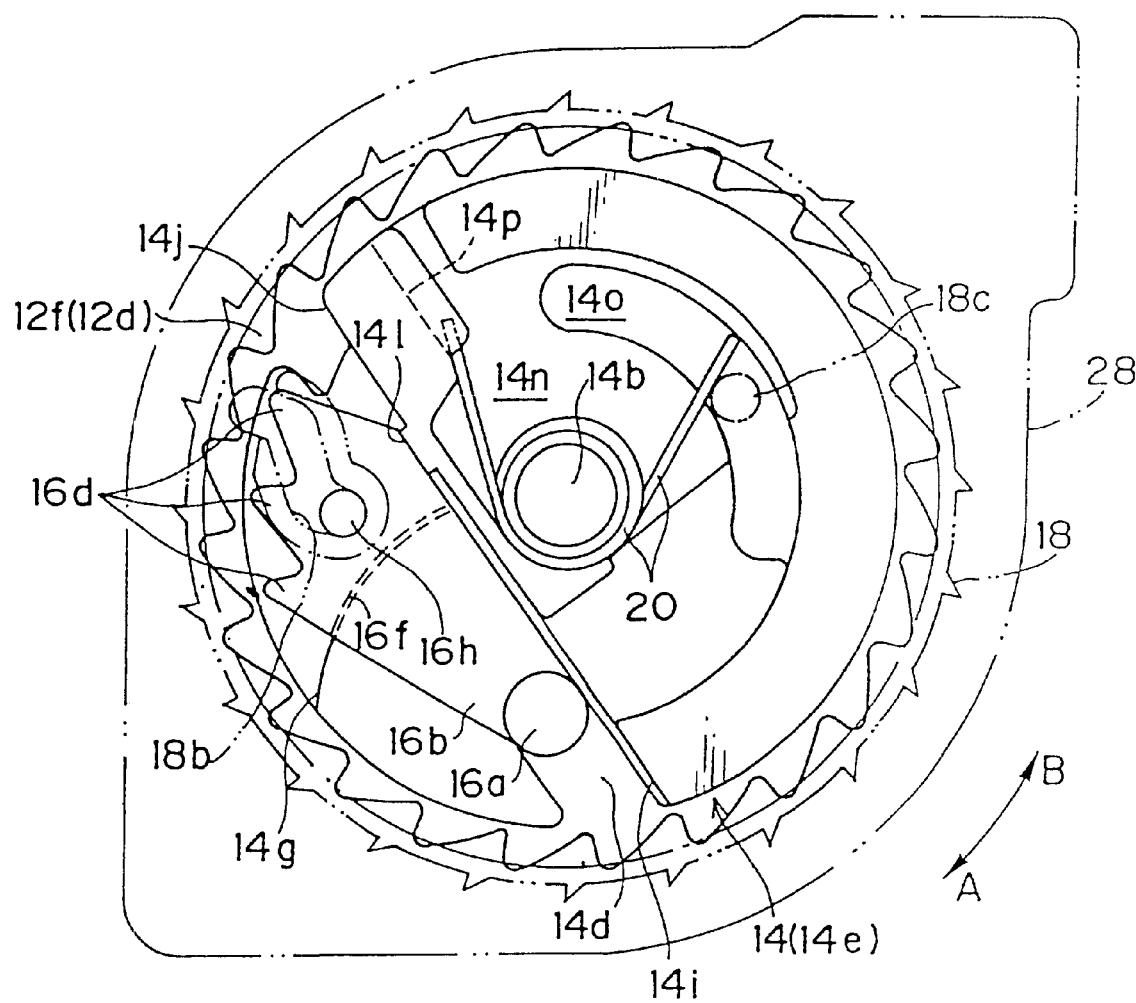
FIG. 2 is a side view, as seen from direction C—C in FIG. 1, showing an unlocked state of the webbing retractor relating to the embodiment of the present invention.
Figure 3:
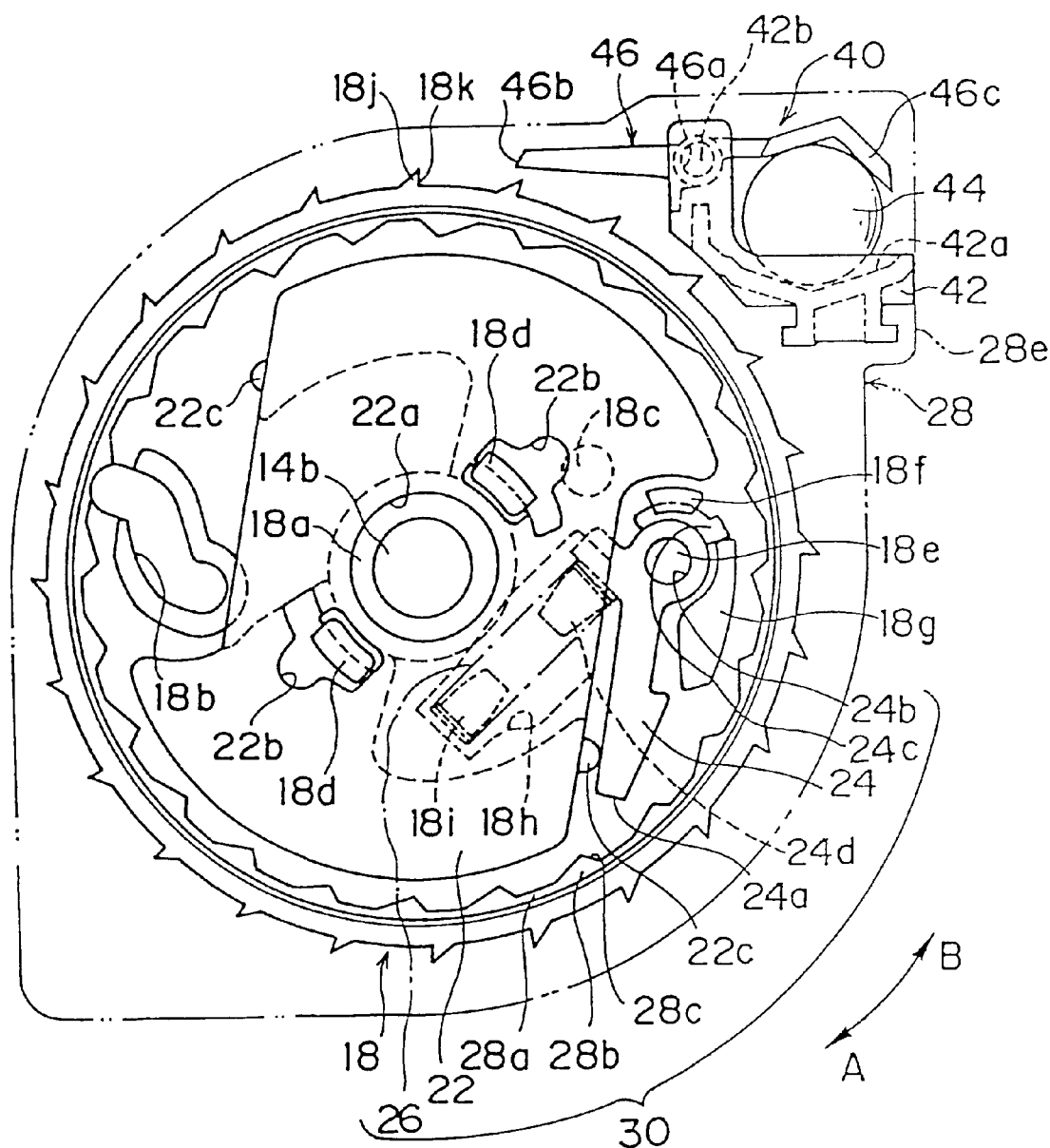
FIG. 3 is a side view, as seen from direction D—D in FIG. 1, showing a non-operating state of a W sensor 30 which forms the webbing retractor relating to the embodiment of the present invention.

In FIG. 1, an overall structure of the webbing retractor 10 relating to the present embodiment is illustrated in cross-section. In FIGS. 2 and 3, the webbing retractor 10 as seen from the directions of C—C and D—D in FIG. 1 is shown in side view. When direction A and direction B are shown in FIGS. 1 through 9, direction A indicates a webbing pull-out direction, and direction B indicates a webbing take-up direction.

As shown in FIG. 1, the webbing retractor 10 has a frame 12. The frame 12 has a pair of opposing leg pieces 12a, 12b, and a back piece 12c which connects the leg pieces 12a, 12b. The frame 12 is thereby formed in a substantial U-shape as seen in plan view. The back piece 12c extends downward, and the lower end portion thereof is fastened and fixed by bolts to a vehicle body.

Internal ratchets 12d, 12e which serve as lock teeth are formed by punching in the leg pieces 12a, 12b of the frame 12. Ratchet teeth 12f, 12g of the internal ratchets 12d, 12e are set to have high strength.

A hollow cylindrical spool 14, whose axial direction is the direction in which the leg pieces 12a, 12b oppose one another, is provided between the opposing leg pieces 12a, 12b of the frame 12. A rotation shaft 14a is formed integrally with one end portion of the spool 14, and the spool is supported at the rotation shaft 14a so as to be freely rotatable. A power spring (not shown) is connected to the distal end portion of the rotation shaft 14a, such that the spool 14 is always urged to rotate in direction B (see FIG. 2). On the other hand, a rotation shaft 14b is formed integrally with the other end portion of the spool 14. A small diameter shaft 14c, whose diameter is small, is formed integrally at the distal end of the rotation shaft 14b. The spool 14 is rotatably supported at the small diameter shaft 14c by a bearing portion 28d of a sensor holder 28 which will be described later. Further, one end of a webbing 50 is anchored on the spool 14. Due the spool 14 rotating, the webbing 50 is freely taken-up onto and pulled-out from the spool 14.

Figure 4A:
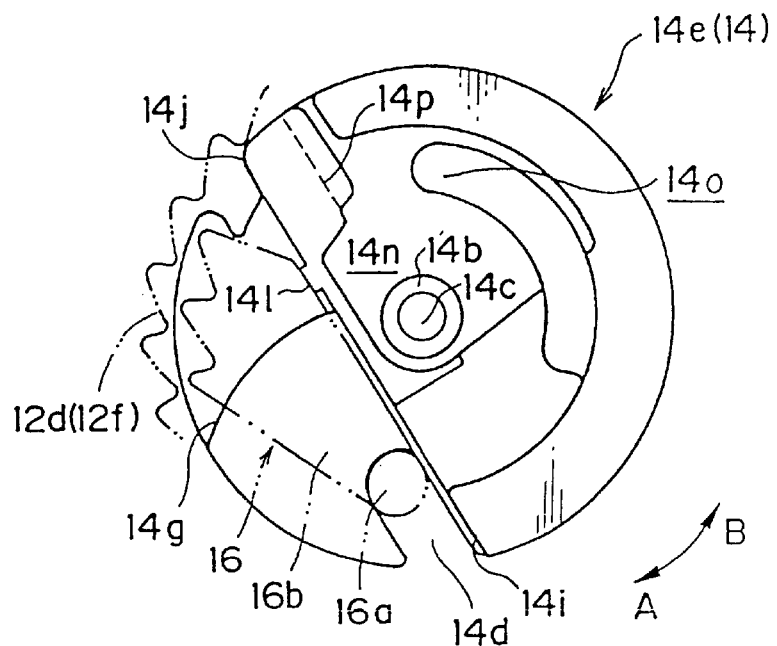
FIG. 4A is a right side view showing a spool which forms the webbing retractor relating to the embodiment of the present invention.
Figure 4B:
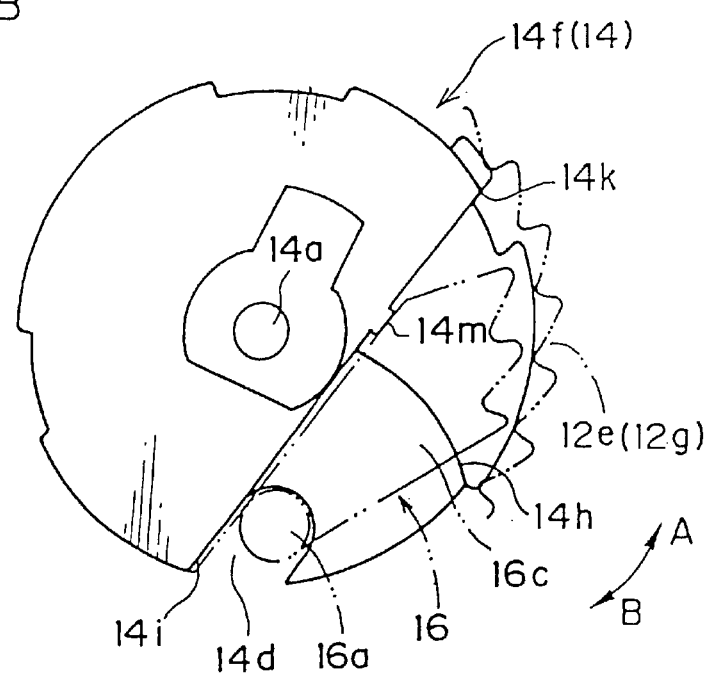
FIG. 4B is a left side view showing the spool which forms the webbing retractor relating to the embodiment of the present invention.
Figure 5:
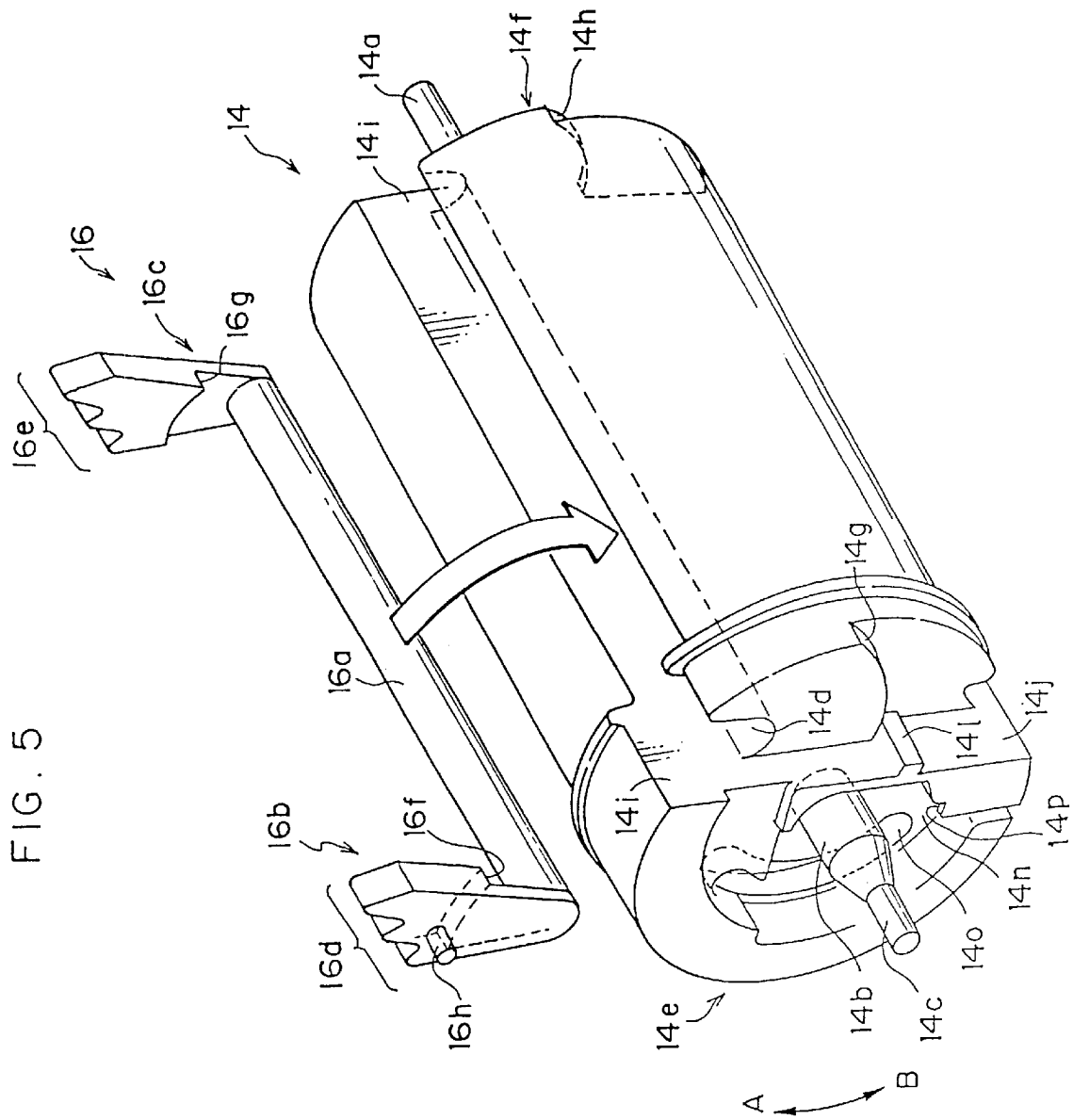
FIG. 5 is a perspective view illustrating the spool and a lock plate which form the webbing retractor relating to the embodiment of the present invention.

As shown in FIGS. 4A, 4B and 5, a cut-out portion 14d is formed at the outer surface of the spool 14. The cut-out portion 14d is positioned so as to be separated by a predetermined distance from a center line of end surfaces 14e, 14f of the spool 14, and is formed along the entire length of the spool 14 except for the portions at which the rotation shafts 14a, 14b and the small diameter shaft 14c are formed. The bottom portion of the cutout portion 14d is formed as a semicircular arc (see FIG. 5 for example). Further, load receiving surfaces 14g, 14h are formed at the end surfaces 14e, 14f of the spool 14, respectively. The load receiving surfaces 14g, 14h are each formed by a circular arc which is concentric with the semicircular arc of the bottom portion of the cut-out portion 14d and by a step in the axial direction of the spool 14 which is formed lower at the outer side of this circular arc. Step portions 14j, 14k are formed in the end surfaces 14e, 14f of the spool 14 along a wall surface 14i at the rotating shaft 14a, 14b sides of the cut-out portion 14d. The rotating shaft 14a, 14b sides of the step portions 14j, 14k are formed to be higher than the upper portions of the load receiving surfaces 14g, 14h. Abutment portions 14l, 14m are formed at the further sides of the load receiving surfaces 14g, 14h as seen from the cut-out portion 14d.

A first concave portion 14n is formed around the rotation shaft 14b of the end surface 14e of the spool 14. A second concave portion 14o, which is formed in a circular arc shape concentric with the rotation shaft 14b, is formed in the first concave portion 14n. A spring receiving portion 14p is formed at one portion of the wall surface forming the first concave portion 14n.

As shown in FIGS. 2 and 5, a solid-cylindrical connecting shaft 16a of a lock plate 16 is swingably inserted into the cut-out portion 14d of the spool 14. Plates 16b, 16c are integrally formed at end portions of the connecting shaft 16a. Lock claws 16d, 16e, which can engage with the ratchet teeth 12f, 12g of the frame 12, are formed at the plates 16b, 16c. The distal end portions of the plates 16b, 16c, including the lock claws 16d, 16e, are formed to be thick toward the inner side of the lock plate 16. At the step portions at the boundaries between these thick and thin portions, operation surfaces 16f, 16g are formed. The operation surfaces 16f, 16g are formed from circular arcs which are concentric with the connecting shaft 16a and which have the same diameters as the load receiving surfaces 14g, 14h of the spool 14.

When the lock plate 16 is mounted to the spool 14, the lock plate 16 is inserted into the cut-out portion 14d, with the connecting shaft 16a being inserted first. Thereafter, the lock plate 16 is rotated around the connecting shaft 16a. In this way, in the state in which the operation surfaces 16f, 16g oppose the load receiving surfaces 14g, 14h, the lock plate 16 is mounted to the spool 14 so as to be freely swingable around the connecting shaft 16a. Further, in this state, the plate 16b and the plate 16c are disposed at the inner sides of the internal ratchets 12d, 12e of the frame 12 so as to oppose the internal ratchets 12d, 12e. In this way, when the plate 16b and the plate 16c are slid (guided) in direction B relative to the spool 14, the lock claws 16d, 16e can engage (self-lock) with the ratchet teeth 12f, 12g. At the time of engagement of the lock plate 16 with the internal ratchets 12d, 12e, due to the operation surfaces 16f, 16g abutting the load receiving surfaces 14g, 14h, the load applied to the lock plate 16 is supported by the spool 14, and the lock plate 16 can be prevented from falling out from the spool 14. Further, the range of swinging of the lock plate 16 is limited due to the lock plate 16 abutting the abutment portions 14l, 14m of the spool 14.

A guide pin 16h is formed at the plate 16b of the lock plate 16. The guide pin 16h is formed as a solid cylindrical projection, and stands erect at the side of the plate 16b which side, as seen from the connecting shaft 16a, is further ahead of the operation surface 16f and is at the side opposite the side of connection with the connecting shaft 16a.

As shown in FIG. 3, a V gear 18 serving as a lock wheel is provided at the outer side of the leg piece 12a of the frame 12. The V gear 18 is formed substantially as a disc having a larger diameter than the end surface 14e of the spool 14. A hollow cylindrical boss 18a is formed at the axially central portion of the V gear 18. The rotation shaft 14b of the spool 14 is inserted into the boss 18a such that the V gear 18 is rotatably supported coaxially with the spool 14. A substantially backward-S-shaped guide hole 18b is formed in the V gear 18. The guide pin 16h which stands at the plate 16b of the lock plate 16 is inserted into the guide hole 18b. In this way, when relative rotation arises between the spool 14 and the V gear 18, the guide hole 18b guides the lock plate 16, via the guide pin 16h, to a position at which the lock plate 16 can engage with the internal ratchets 12d, 12e (i.e., swings the lock plate 16 in direction B relative to the spool 14).

Figure 6:
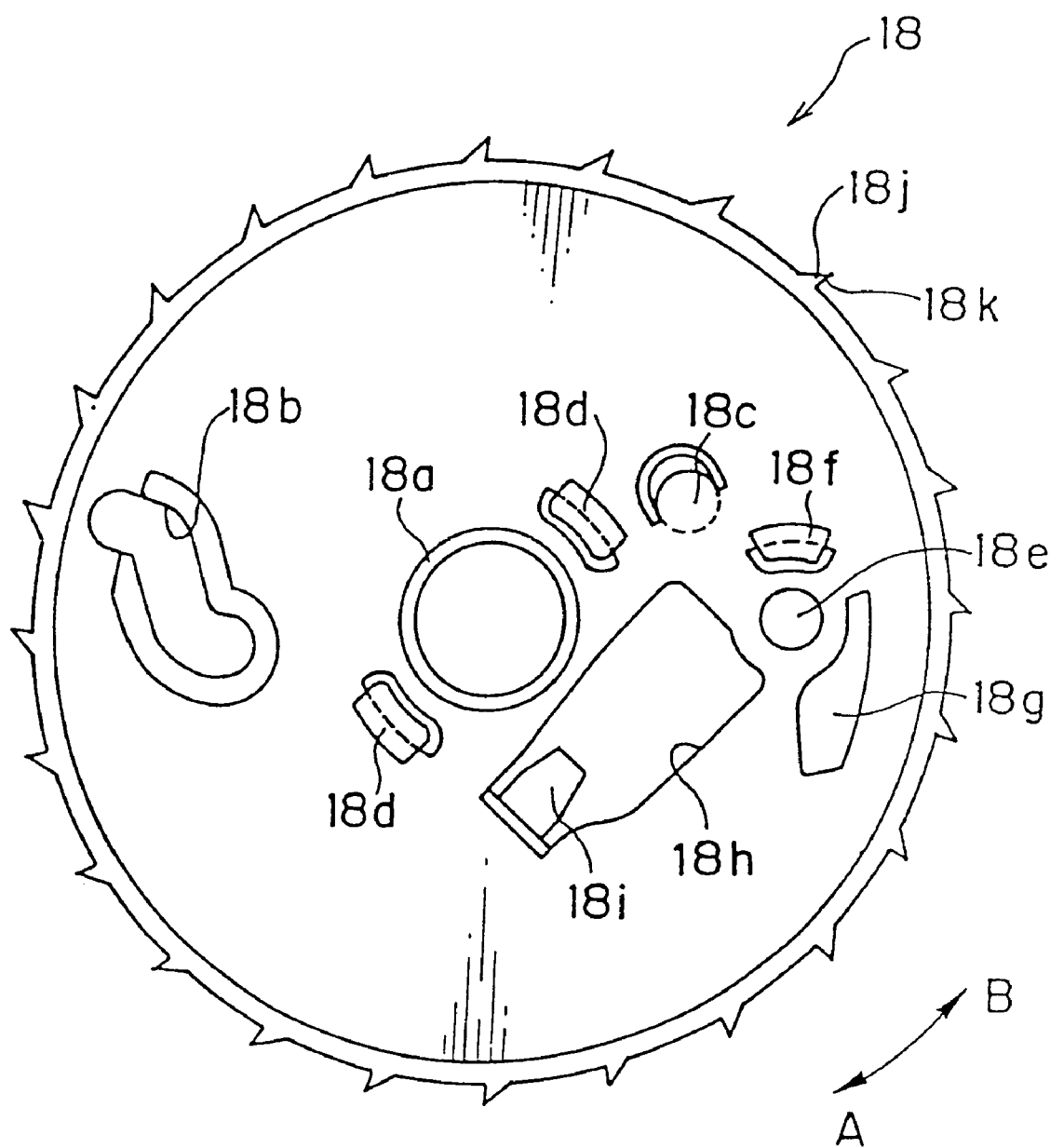
FIG. 6 is a plan view showing a V gear which forms the webbing retractor relating to the embodiment of the present invention.

Further, as shown in FIG. 6, a supporting projection 18c is provided at the spool 14 side surface of the V gear 18. The distal end portion of the supporting projection 18c is inserted into the second concave portion 14o provided at the end surface 14e of the spool 14. One end portion of a return spring 20, which is a torsion coil spring, engages with the supporting projection 18c. The return spring 20 is disposed within the first concave portion 14n around the rotation shaft 14b, in a state in which the other end portion of the return spring 20 is engaged with the spring receiving portion 14p of the spool 14. In this way, the lock plate 16 is urged in direction A with respect to the spool 14, via the guide pin 16h, the V gear 18 (the guide hole 18b), and the return spring 20. Usually, the lock plate 16 abuts the abutment portions 14l, 14m of the spool 14, so as to not obstruct rotation of the spool 14. In this way, the V gear 18 as well usually rotates integrally with the spool 14.

Anchor portions 18d are provided at the surface of the V gear 18 at the side opposite the spool 14 side. The anchor portions 18d are, as seen in plan view, formed in circular arc shapes which are coaxial with the boss 18a, and are disposed at two locations which are symmetrical with respect to the boss 18a. A pawl shaft 18e is provided at the anchor portion 18d side surface of the V gear 18. The pawl shaft 18e is formed in a solid cylindrical shape, and is disposed at a position which is substantially symmetrical, around the boss 18a, to the guide hole 18b. A pawl anchor portion 18f, which is formed in a circular arc shape which is concentric with the pawl shaft 18e as seen in plan view, is formed in a vicinity of the pawl shaft 18e at the same side surface of the V gear 18. A stopper 18g, which corresponds to the configuration of a pawl 24 which will be described later, is formed in a vicinity of the pawl shaft 18e and the pawl anchor portion 18f. A spring hole 18h is provided in the V gear 18. A spring receiving portion 18i is formed at the end surface of the spring hole 18h which end surface substantially opposes the pawl shaft 18e.

A plurality of external teeth 18j serving as engagement teeth are formed at uniform intervals in the outer peripheral portion of the V gear 18. Engagement surfaces 18k of the external teeth 18j are formed in circular arcs which correspond to the locus of swinging of a distal end portion 46b of a sensor lever 46 of an acceleration sensor 40 which will be described later.

As shown in FIGS. 1 and 3, an inertia plate 22 is provided at the side of the V gear 18 opposite the spool 14 side. The inertia plate 22 is formed as a disc from which two peripheral portions, which are symmetrical with respect to the axis of rotation, have been cut out. A support hole 22a is formed in the axially central portion of the inertia plate 22. Anchor holes 22b, which are formed in circular arc shapes which are concentric with the support hole 22 as seen in plan view, are formed at two positions in the inertia plate 22 which are symmetrical with respect to the support hole 22a. The support hole 22a and the anchor holes 22b correspond to the boss 18a and the anchor portions 18d of the V gear 18. The boss 18a is inserted into the support hole 22a, and the anchor portions 18d are inserted into the anchor holes 22b. The anchor portions 18d engage with the inner peripheral portions of the anchor holes 22b, and the inertia plate 22 is supported so as to be coaxial with the V gear 18 (the spool 14), and so as to be swingable, and so as to not fall off. Further, the circular arc of the anchor hole 22b is formed to be longer (to have a greater angle of circumference) than the circular arc of the anchor portion 18d. In an initial state, the inertia plate 22 is disposed so as to be able to swing in direction B with respect to the V gear 18, in a range of the difference between the lengths (the angles of circumference) of these circular arcs. Further, engagement projections 22c are formed at the surfaces opposing direction A, at the cut-out portions of the inertia plate 22.

Figure 7A:
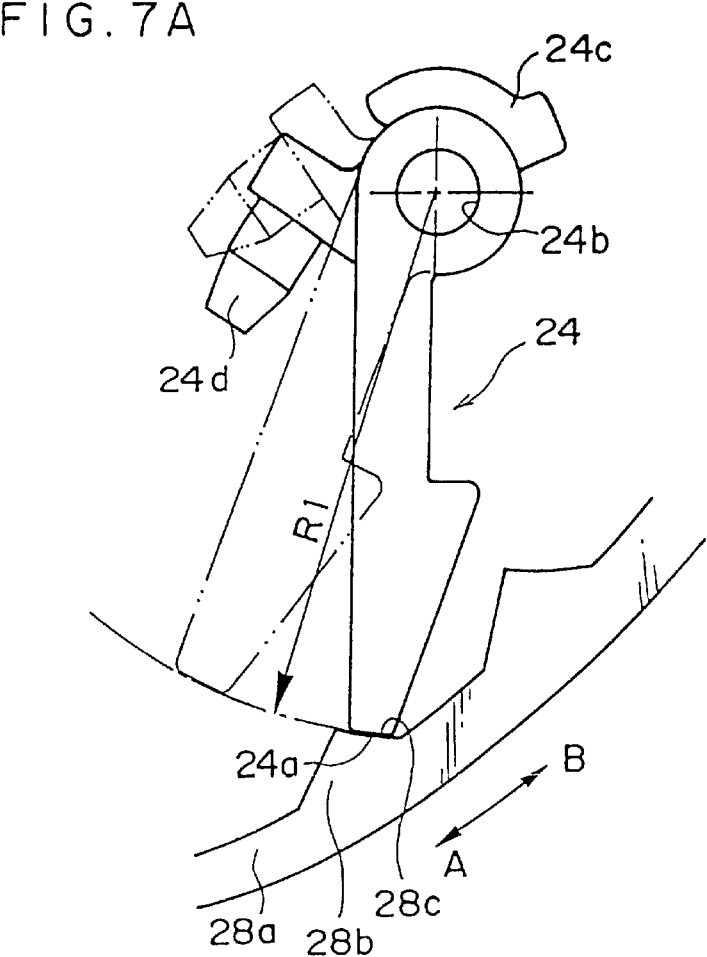
FIG. 7A is a side view showing a configuration of an engagement portion of the W sensor forming the webbing retractor relating to the embodiment of the present invention.

The pawl 24 is connected to the pawl shaft 18e of the V gear 18. As shown in FIG. 7A, the pawl 24 includes a distal end portion 24a which engages with internal teeth 28b formed at the sensor holder 28 which will be described later; a shaft hole 24b into which the pawl shaft 18e is inserted; an anchor projection 24c which anchors on the pawl anchor portion 18f; and a spring receiving portion 24d. The radius of swinging of the distal end portion 24a of the pawl 28 is R1 shown in FIG. 7A. The distal end portion 24a of the pawl 28 is formed by a circular arc which is concentric with the shaft hole 24b and which has a radius of R1.

As shown in FIG. 3, the pawl 24 is swingably supported at the side surface of the V gear 18 in a state in which the pawl shaft 18e of the V gear 18 is inserted into the shaft hole 24b. In this state, the anchor projection 24c is anchored on the pawl anchor portion 18f such that the pawl 24 can be prevented from falling off. Further, the range of swinging of the pawl 24 is limited by the stopper 18g which corresponds to the configuration of the pawl 24. Moreover, one end portion of a coil spring 26 serving as an elastic body is inserted and held in the spring receiving portion 24d of the pawl 24. The coil spring 26 is disposed and held in the spring hole 18h of the V gear 18 in a state in which the spring receiving portion 18i of the V gear 18 is inserted and into the other end portion of the coil spring 26. In this state, the pawl 24 is engaged with the engagement projection 22c of the inertia plate 22. Thus, the pawl 24 and the inertia plate 22 are urged in direction A with respect to the V gear 18, and usually rotate (revolve around the rotation shaft 14b) integrally with the V gear 18 without swinging.

The sensor holder 28 is fixed and held at the outer side of the leg piece 12a of the frame 12. The sensor holder 28 is formed in a substantial cap shape, and is fixed and held at the outer side of the leg piece 12a in a state in which the opening portion thereof opposes the leg piece 12a and in which the V gear 18, the inertia plate 22, the pawl 24, and the like are accommodated within the interior thereof. A hollow cylindrical portion 28a serving as a tube-shaped member is formed at the inner portion of the sensor holder 28. The internal teeth 28b serving as engagement teeth are formed at the inner surface of the cylindrical portion 28a. The internal teeth 28b are disposed at the outer side of the pawl 24. When the pawl 24 swings in direction B relative to the V gear 18, the internal teeth 28b can engage with the distal end portion 24a of the pawl 24.

In the above-described structure, the inertia plate 22, the pawl 24, the coil spring 26, and the internal teeth 28b form a W sensor 30 which forms a WSIR, and correspond to the "lock operation device" of the present invention.

Further, as shown in FIG. 7A, an engagement surface 28c of the internal tooth 28b, which engagement surface 28c engages with the distal end portion 24a of the pawl 24, is formed so as to correspond to the locus of swinging of the distal end portion 24a of the pawl 24. Namely, the engagement surface 28c of the internal tooth 28b, which is at a position of engaging with the distal end portion 24a of the pawl 24, is formed by a circular arc which is concentric with the shaft hole 24b of the pawl 24 and which has a radius of R1.

The bearing portion 24d is provided at the axially central portion of the sensor holder 28. As described above, the bearing portion 24d rotatably supports the small diameter shaft 14c of the spool 14.

A holder portion 28e is formed integrally with the outer peripheral portion of the sensor holder 28. The V sensor (acceleration sensor) 40 is provided in the holder portion 28e. Note that the V sensor 40 is not shown in FIG. 1.

As shown in FIG. 3, the V sensor 40 has a housing 42, and the housing 42 is fixed and held at a holder portion 28e of the sensor holder 28. A bottom surface 42a, which is V-shaped and has a shallow bottom, is formed at the housing 42. A ball 44, which serves as an inertial body, is placed on the bottom surface 42a. The sensor lever 46, which serves as a pawl, is connected to the housing 42. The sensor lever 46 is supported at the housing 42 so as to be freely swingable, by a support shaft 42b provided at the housing 42 being inserted into a shaft hole 46a provided at a substantially central portion of the sensor lever 46. The sensor lever 46 includes a distal end portion 46b which can engage with the external teeth 18j of the V gear 18, and an abutment portion 46c which is formed at the side of the shaft hole 46a opposite the side at which the distal end portion 46b is provided and whose inertial moment is greater than that of the distal end portion 46b. The abutment portion 46c abuts and is set on the ball 44. In this state, the distal end portion 46b is, due to gravity, positioned at a position of non-engagement with the external teeth 18j of the V gear 18. In this way, at the V sensor 40, the non-engaged state of the distal end portion 46b and the external teeth 18j of the V gear 18 is usually maintained due to gravity. At the time of rapid deceleration of the vehicle, due to the ball 44 rolling on a seat surface 44a, the sensor lever 46 swings, such that the distal end portion 46b moves to a position of engagement with the external teeth 18j of the V gear 18.

Figure 7B:
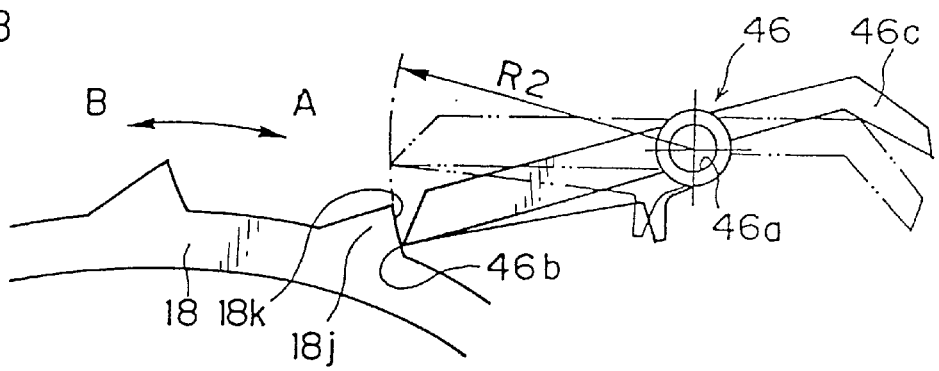
FIG. 7B is a side view showing a configuration of an engagement portion of a V sensor forming the webbing retractor relating to the embodiment of the present invention.
Figure 8:
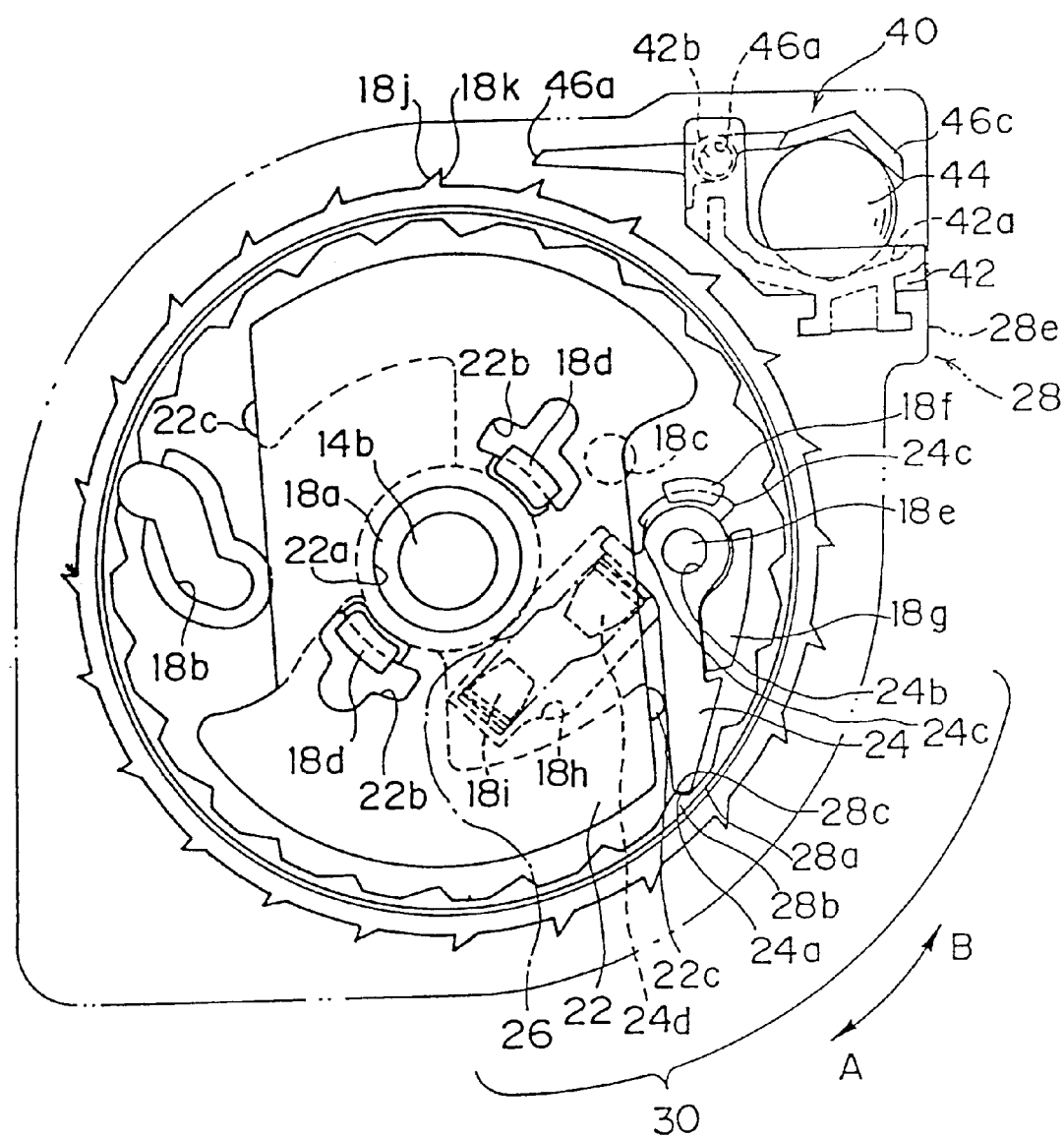
FIG. 8 is a side view corresponding to FIG. 3 and illustrating an operating state of the W sensor 30 forming the webbing retractor relating to the embodiment of the present invention.

As shown in FIG. 7B, the radius of swinging of the sensor lever 46 is R2. As described above, the engagement surface 18k of the external tooth 18j of the V gear 18 is formed by a circular arc which corresponds to the locus of swinging of the sensor lever 46. Namely, the engagement surface 18k of the external tooth 18j, which is at a position of engaging with the distal end portion 46b of the sensor lever 46, is formed by a circular arc which is concentric with the shaft hole 46a of the sensor lever 46 and which has a radius of curvature of R2.

In the above-described structure, the V sensor 40 and the external teeth 18j form the VSIR, and in addition, correspond to the "lock operation device" of the present invention.

Next, operation of the present embodiment will be described.

In the webbing retractor 10 having the above-described structure, the spool 14 is supported so as to be freely rotatable, and the lock plate 16 is urged in the webbing pull-out direction (direction A) by the return spring 20. Thus, usually, the spool 14, the lock plate 16, and the V gear 18 rotate integrally. Further, usually, the pawl 24 of the W sensor 30 is urged in direction A by the coil spring 26, and the sensor lever 42 of the V sensor 40 is held on the ball 46 due to gravity. Thus, the W sensor 30 and the V sensor 40 do not operate. Therefore, usually, the webbing 50 can be freely taken-up and pulled-out.

Hereinafter, operation of the webbing retractor 10 will be described by describing a case in which the W sensor 30 is operated and a case in which the V sensor 40 is operated.

(Case in which W Sensor 30 is Operated)

When the webbing 50 is rapidly pulled-out, the spool 14 and the V gear 18 rotate at high speed in direction A. At this time, the inertia plate 22 does not follow the V gear 18, and an inertial delay is generated against the urging force of the coil spring 26, and the inertia plate 22 rotates in direction B relative to the V gear 18. When the inertia plate 22 rotates in direction B relative to the V gear 18, the pawl 24, which is engaged with the engagement projection 22c of the inertia plate 22, is pushed and swung in direction B and engages with the internal tooth 28b of the sensor holder 28 such that rotation of the V gear 18 in direction A is impeded (the state shown in FIG. 8).

When rotation of the V gear 18 in direction A is impeded, then, the spool 14 to which the webbing tensile force is applied rotates in direction A against the urging force of the return spring 20 and pushes the operation surface 16f of the lock plate 16 at the load receiving surface 14g. Because rotation of the V gear 18 in direction A is impeded, the lock plate 16, which is A pushed at the operation surface 16f, cannot follow the spool 14, and is guided by the guide hole 18b of the V gear 18 (swings in direction B relative to the spool 14). The lock claw 16d is thereby guided to a position at which engagement with the ratchet tooth 12f of the internal ratchet 12d is possible. In this state, a portion of the distal end of the lock claw 16d enters a state of being engaged with the ratchet tooth 12f (enters the state shown in FIG. 9A). Further, although not illustrated, the plate 16c of the lock plate 16, which is pushed by the operation receiving surface 14h of the spool 14, is also swung via the connecting shaft 16a. In this way, the lock claw 16e is guided to a position of engagement with the ratchet tooth 12g of the internal ratchet 12e, and a portion of the distal end of the lock claw 12e engages with the ratchet tooth 12g.

Figure 9A:
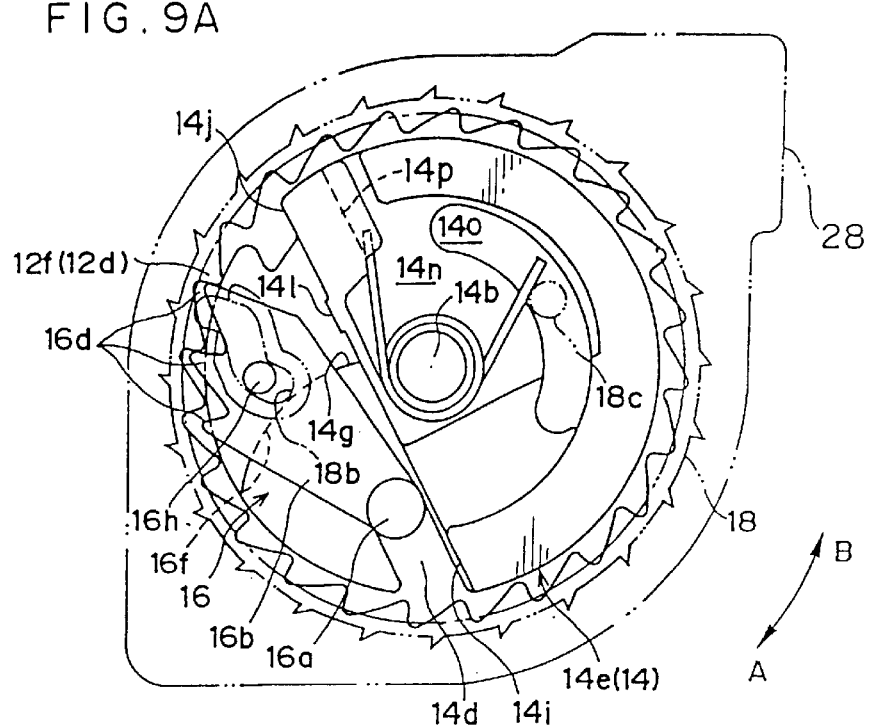
FIG. 9A is a side view corresponding to FIG. 2 and showing a lockable state, in a locking process of the webbing retractor relating to the embodiment of the present invention.
Figure 9B:
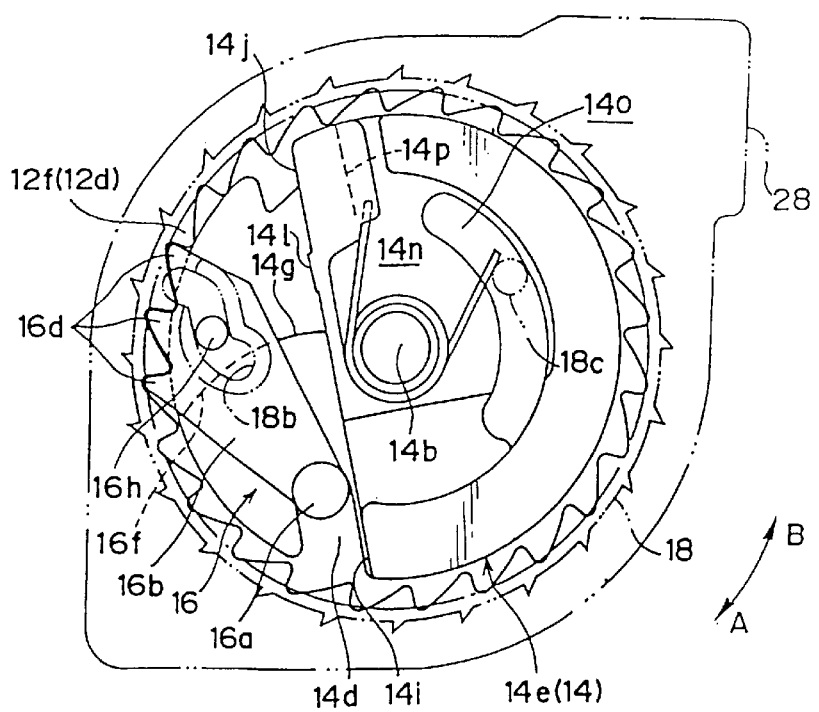
FIG. 9B is a side view corresponding to FIG. 2 and showing a lock completed state, in a locking process of the webbing retractor relating to the embodiment of the present invention.
Figure 10A:
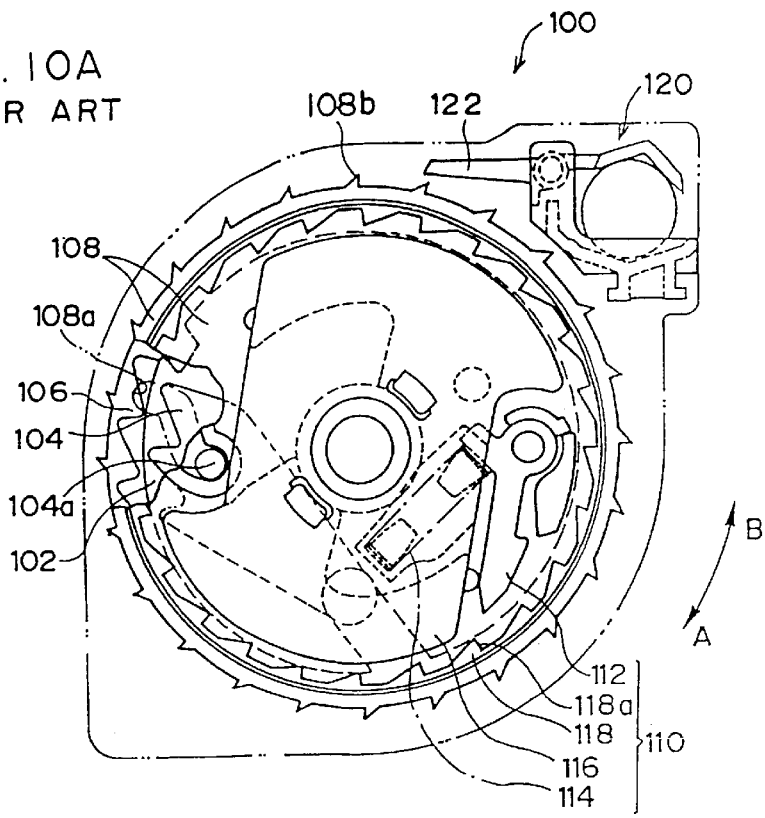
FIG. 10A is a side view showing a non-operating state of a W sensor forming a conventional webbing retractor. FIG.
Figure 10B:
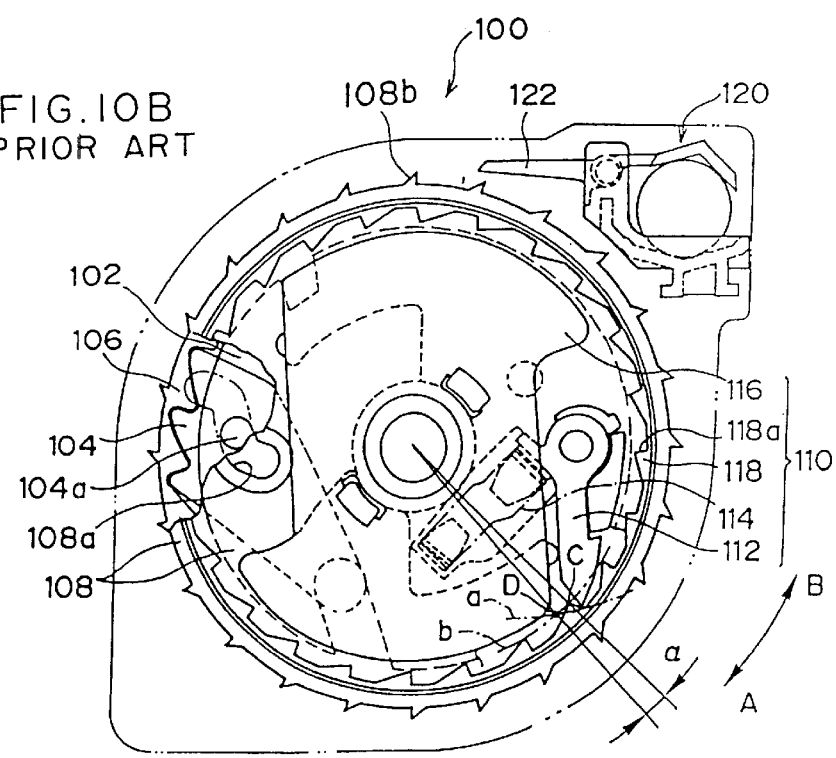

When the lock claws 16d, 16e of the plates 16b, 16c are respectively guided to positions at which engagement with the ratchet teeth 12f, 12g is possible, as the spool 14 rotates further in direction A, the lock claws 16d, 16e are guided by the ratchet teeth 12f, 12g and reach the tooth bottoms of the ratchet teeth 12f, 12g (the state shown in FIG. 9B). In this way, the lock plate 16 is reliably locked by the internal ratchets 12d, 12e, and rotation of the spool 14 in direction A is impeded, and further pulling-out of the webbing is limited. Namely, after the lock claws 16d, 16e have been guided to the positions at which engagement with the ratchet teeth 12f, 12g is possible, the spool 14 (the lock plate 16) self-locks.

At the time of self-locking, the plate 16b moves toward the tooth bottom of the ratchet tooth 12f (i.e., toward the left in FIGS. 9A and 9B). Accompanying this movement of the plate 16b, the guide pin 16h pushes the side wall of the guide hole 18b of the V gear 18 toward the left in FIG. 9A (or FIG. 9B), and due to this pushing moment, the V gear 18 is rotated slightly in direction B. When the V gear 18 is rotated a predetermined amount in direction B, the engagement of the distal end portion 24a of the pawl 24 and the engagement surface 28c of the internal tooth 28b is released, and the pawl 24 returns to its original position due to the urging force of the coil spring 26. Namely, operation of the W sensor 30 is cancelled.

On the other hand, after pulling-out of the webbing is hindered, the tension applied to the webbing 50 decreases, and when the spool 14 is rotated in direction B by a predetermined angle (i.e., when the webbing 50 is taken-up by a predetermined amount), the engaged state of the lock plate 16 and the internal ratchets 12d, 12e is cancelled.

Namely, when the spool 14 is rotated in direction B, the lock plate 16 is pushed at the connecting shaft 16a by the peripheral portion of the cut-out portion 14d of the spool 14. The lock claws 16d, 16e thereby move apart from the ratchet teeth 12f, 12g of the internal ratchets 12d, 12e, and due to the urging force of the return spring 20, the lock plate 16 returns to its original position together with the V gear. 18 (return to the state illustrated in FIGS. 2 and 3). Note that the taking-up of the webbing after a decrease in the tension applied to the webbing 50 is achieved by an unillustrated power spring which is connected to the rotation shaft 14a of the spool 14.

In this way, in the process in which the pulling-out of the webbing is hindered, operation of the W sensor 30 is cancelled. Thus, thereafter, it is again possible to pull-out the webbing.

Here, the engagement surface 28c of the internal tooth 28b is formed by a circular arc which has the swinging radius R1 of the pawl 24 and whose center is the center of swinging of the pawl 24 (i.e., which is concentric with the shaft hole 24b) in the state illustrated in FIG. 7A in which the engagement surface 28c of the internal tooth 28b is engaged with the distal end portion 24a of the pawl 24. Namely, the engagement surface 28c of the internal tooth 28b is formed to correspond to the locus of swinging of the distal end portion 24a of the pawl 24. Thus, the angle needed to cancel the operation of the W sensor 30 (hereinafter, the "W sensor cancel angle") is the minimum value (substantially 0 [rad]). Namely, if the distal end portion 24a of the pawl 24 and the engagement surface 28c of the internal tooth 28b are separated to the extent that the frictional force, which is applied to the portion of engagement of the distal end portion 24a of the pawl 24 and the engagement surface 28c of the internal tooth 28b (the frictional force which makes the webbing tensile force slightly transmitted via the spool 14, the V gear 18 and the return spring 20 into resistance), is smaller than the urging force in direction A due to the coil spring 26, the pawl 24 returns to its original position due to the urging force of the coil spring 26. In this way, a sufficiently small W sensor cancel angle can be obtained by moderate machining precision and assembly precision of the internal teeth 28b. Thus, the operation of the W sensor 30 is reliably cancelled due to the rotation (predetermined rotation amount) of the V gear 18 in direction B accompanying the self-locking, and after the pulling-out of the webbing 50 is impeded, pulling-out of the webbing 50 is again possible.

At the time of operation of the W sensor 30 as well, because the engagement surface 28c of the internal tooth 28b is formed so as to correspond to the locus of swinging of the distal end portion 24a of the pawl 24, regardless of what position of the engagement surface 28c of the internal tooth 28b is engaged by the distal end portion 24a of the pawl 24, the above-described slightly transmitted webbing tensile force is applied to this engaged position, and the pawl 24 is pushed and held at this engaged position. As a result, at the time of operation of the W sensor 30, the distal end portion 24a of the pawl 24 and the engagement surface 28c of the internal tooth 28b engage without phase offset, and rotation of the V gear 18 in direction A is reliably impeded.

The configuration of the distal end portion 24a of the pawl 24 is a circular arc which has a radius R1 and which is concentric with the shaft hole 24b. Namely, the distal end portion 24a is formed so as to correspond to the locus of swinging of the pawl 24. Thus, there is planar contact at the time of engagement of the distal end portion 24a of the pawl 24 and the engagement surface 28c of the internal tooth 28b, and rotation of the V gear 18 in direction A can be prevented even more reliably. Further, even if a portion of the distal end portion 24a of the pawl 24 and a portion of the engagement surface 28c of the internal tooth 28b engage, rotation of the V gear in direction A can be impeded, and thus, phase offset can reliably be prevented. (Case in which V Sensor 40 is Operated)

In a state in which the vehicle rapidly decelerates, due to the inertial force accompanying this state, the ball 44 of the V sensor 40 rolls on the substantially V-shaped seat surface 42a of the housing 42, and the abutment portion 46c of the sensor lever 46, which is placed on and abuts the ball 44, is swung upward. Thus, the distal end portion 46b, which is positioned at the side of the shaft hole 46a (which is the center of swinging) opposite the side at which the abutment portion 46 is disposed, is swung downward, and reaches the position of engagement with the external tooth 18j of the V gear 18.

On the other hand, when the vehicle rapidly decelerates, the vehicle occupant also moves inertially, and thus, the webbing 50 is pulled-out. As a result, the V gear 18 rotates together with the spool 14 in direction A, and the engagement surface 18k of the external tooth 18j engages the distal end portion 46b of the sensor lever 46. Rotation of the V gear 18 in direction A is thereby impeded.

A Thereafter, the operations of the V gear 18 guiding the lock plate 16 to the position at which engagement with the internal ratchets 12d, 12e is possible, the lock plate 16 self-locking, and the V gear 18 being rotated in direction B, and the operation of the releasing of the locking which accompanies the taking up of the webbing 50, are exactly the same as those in the previously-described "Case in which W Sensor 30 is Operated", and thus, description thereof will be omitted.

As described above, when the V gear 18 rotates a predetermined amount in direction B, the engagement of the distal end portion 46b of the sensor lever 46 and the engagement surface 18k of the external tooth 18j is cancelled, and the sensor lever 46 returns to its original position due to gravity. Namely, the operation of the V sensor 40 is cancelled.

In this way, in the process in which the pulling-out of the webbing is impeded, the operation of the V sensor 40 is cancelled. Thus, thereafter, pulling-out of the webbing again is possible.

Here, the engagement surface 18k of the external tooth 18j is formed as a circular arc which has the swinging radius R2 of the sensor lever and whose center is the center of swinging of the sensor lever 46 (i.e., which is concentric with the shaft hole 46a) in the state shown in FIG. 7B in which the engagement surface 18k of the external tooth 18j and the distal end portion 46b of the sensor lever 46 are engaged. Namely, the engagement surface 18k of the external tooth 18j is formed to correspond to the locus of swinging of the distal end portion 46b of the sensor lever 46. As a result, the angle needed for canceling the operation of the V sensor 40 (hereinafter, the "sensor cancel angle") is the minimum value (substantially 0 [rad]). Namely, if the distal end portion 46b of the sensor lever 46 and the engagement surface 18k of the external tooth 18j are separated to the extent that the frictional force, which is applied to the portion of engagement of the distal end portion 46b of the sensor lever 46 and the engagement surface 18k of the external tooth 18j (the frictional force which makes the webbing tensile force slightly transmitted via the spool 14, the V gear 18 and the return spring 20 into resistance), is smaller than the gravity applied in direction A, the sensor lever 46 returns to its original position due to gravity. In this way, a sufficiently small V sensor cancel angle can be obtained by moderate machining precision and assembly precision of the external teeth 18*j*. Thus, the operation of the V sensor 40 is reliably cancelled due to the rotation of the V gear 18 in direction B accompanying the self-locking, and after the pulling-out of the webbing 50 is impeded, pulling-out of the webbing 50 is again possible.

At the time of operation of the V sensor 40 as well, because the engagement surface 18*k* of the external tooth 18*j* is formed so as to correspond to the locus of swinging of the distal end portion 46*b* of the sensor lever 46, regardless of what position of the engagement surface 18*k* of the external tooth 18*j* is engaged by the distal end portion 46*b* of the sensor lever 46, the above-described slightly transmitted webbing tensile force is applied to this engaged position, and the sensor lever 46 is pushed and held at this engaged position. As a result, at the time of operation of the V sensor 40, the distal end portion 46*b* of the sensor lever 46 and the engagement surface 18*k* of the external tooth 18*j* engage without phase offset, and rotation of the V gear 18 in direction A is reliably impeded.

In this way, at the webbing retractor 10 relating to the present embodiment, by making the W sensor cancel angle and the V sensor cancel angle minima (substantially 0 [rad] in theory), the pull-out impeded state of the webbing 50 can be reliably cancelled without the need for excessive precision in the machining and assembly of parts such as the V gear 18 and the sensor holder 28 and the like. Further, at times when the webbing 50 is pulled-out rapidly and when the vehicle rapidly decelerates, rotation of the spool 14 in the webbing pull-out direction can be hindered without phase offset.

In the above-described embodiment, both the W sensor 30 and the V sensor 40 are included. However, the present invention is not limited to the same, and the webbing retractor may be structured to include only one of the W sensor 30 and the V sensor 40. Further, the W sensor, which senses rapid pulling-out of the webbing, and the V sensor, which senses rapid deceleration of the vehicle, are not limited to the above-described structures, and it suffices for rotation of the V gear (the lock wheel) in the webbing pull-out direction to be impeded due to engagement of the pawl (sensor lever) and the engagement tooth in each predetermined case. Accordingly, for example, the V sensor may be provided beneath the V gear, and the sensor lever may be a structure in which the distal end portion and the abutment portion are the same.

Further, in the above-described embodiment, the distal end portion 24*a* of the pawl 24 is formed so as to correspond to the locus of swinging thereof. However, the present invention is not limited to the same, and, for example, the distal end of the pawl may be acute, or may be a circular arc having a radius which is smaller than the swinging radius R1. Similarly, in the above described embodiment, the distal end portion 46*b* of the sensor lever 46 has an acute structure, but the present invention is not limited to the same. For example, the distal end of the sensor lever may be a circular arc which corresponds to the locus of swinging, or may be a circular arc whose radius is smaller than the swinging radius R2.

Moreover, in the above-described embodiment, the plates 16*b*, 16*c* of the lock plate 16 are formed so as to be disposed at the both end portions of the spool 14. However, the present invention is not limited to the same, and, for example, the lock plate may be structured so as to be disposed at only one side of the spool. In this case, by disposing the lock plate at the side at which the V gear is disposed, there is no need for the connecting shaft and the cut-out portion of the spool.

The webbing retractor 10 relating to the above-described embodiment is structured so as to impede pulling-out of the webbing in predetermined cases. However, the present invention is not limited to the same, and various mechanisms may be added. Accordingly, for example, a pretensioner mechanism, in which the vehicle occupant is restrained by taking-up the webbing by a given amount at the time of a rapid deceleration of the vehicle, or a force limiter mechanism, which, after pulling-out of the webbing is impeded, permits the webbing to be pulled-out by a predetermined amount and absorbs energy, or the like may be added. In this case, the lock plate is not limited to a structure which is directly set at the spool. For example, the lock plate may be connected to the spool via a lock base which is connected to a torsion bar.

As described above, the webbing retractor relating to the present invention has the excellent effects that a webbing pull-out impeded state can be reliably cancelled without the need for excessive precision in the machining and assembly of parts, and that, in predetermined cases, rotation of the spool in the webbing pull-out direction can be impeded without phase offset.

What is claimed is:

1. A webbing retractor comprising:

a spool which is tube-shaped and on which a webbing is taken-up and from which the webbing is pulled-out;

a lock tooth formed at a surface, which intersects a rotation shaft of the spool, of a frame which is fixed and held at a vehicle and which rotatably supports both ends of the spool;

a lock plate formed so as to be engageable with the lock tooth and connected to the spool so as to be freely swingable, and when the spool is rotated in a webbing pull-out direction from a position at which the lock plate can engage with the lock tooth, the lock plate is guided by the lock tooth and moved toward a tooth bottom of the lock tooth and engages with the lock tooth, such that the lock plate impedes rotation of the spool in the webbing pull-out direction;

a lock wheel formed in a disc-shape and provided coaxially with the spool at one end side of the spool, the lock wheel usually rotating integrally with the spool and holding the lock plate at a position of non-engagement with the lock tooth, and when relative rotation arises between the lock wheel and the spool, the lock wheel guides the lock plate to a position at which engagement with the lock tooth is possible, and as the lock plate moves toward the tooth bottom of the lock tooth, the lock wheel is rotated in a webbing take-up direction; and a lock operation device having a pawl which is swingably supported and an engagement tooth which can engage with the pawl, the pawl usually being held at a position of non-engagement with the engagement tooth, and in a predetermined case, due to the pawl swinging and engaging with the engagement tooth, rotation of the lock wheel in the webbing pull-out direction is impeded, and due to the lock wheel being rotated in the webbing take-up direction, an engaged state of the pawl and the engagement tooth is cancelled, wherein an engagement surface of the engagement tooth, which engagement surface engages with the pawl, is formed in a circular arc shape corresponding to a locus of swinging of a region at which the pawl engages with the engagement tooth.

2. A webbing retractor according to claim 1, wherein the engagement tooth of the lock operation device is formed at an inner peripheral surface of a tube-shaped member which is fixedly provided at the frame, and in a state in which the pawl of the lock operation device is accommodated within the tube-shaped member, the pawl is supported at the lock wheel so as to be freely swingable around a shaft which is parallel to the rotation shaft of the spool, and the pawl is connected to one end portion of an elastic body whose other end portion is connected to the lock wheel, and usually, the pawl is urged in a direction of non-engagement with the engagement tooth by urging force of the elastic body, and at a time when the webbing is rapidly pulled-out, the pawl swings in a direction of engaging with the engagement tooth against the urging force of the elastic body, and due to the lock wheel being rotated in the webbing take-up direction, the pawl separates from the engagement tooth and returns to a position of non-engagement with the engagement tooth due to the urging force of the elastic body.

3. A webbing retractor according to claim 2, wherein a region of engagement of the pawl with the engagement tooth is formed so as to correspond to a locus of swinging of the pawl.

4. A webbing retractor according to claim 2, wherein the lock operation device has at least one sensor for operation control.

5. A webbing retractor according to claim 1, wherein a region of engagement of the pawl with the engagement tooth is formed so as to correspond to a locus of swinging of the pawl.

6. A webbing retractor according to claim 5, wherein the region of engagement of the pawl is formed as a circular arc of a radius which is smaller than a radius of swinging of the pawl.

7. A webbing retractor according to claim 5, wherein the lock plate is disposed at only one side of the spool.

8. A webbing retractor according to claim 1, wherein the lock operation device has at least one sensor for operation control.

9. A webbing retractor according to claim 8, wherein the sensor is a webbing sensor, and the webbing sensor is accommodated within a holder which is provided at an outer side of one leg piece of the frame.

10. A webbing retractor according to claim 9, further comprising an acceleration sensor, the acceleration sensor being accommodated in a housing which is fixed to one portion of the holder of the webbing sensor.

11. A webbing retractor according to claim 10, wherein the acceleration sensor is provided beneath the lock wheel.

12. A webbing retractor according to claim 1, wherein the lock plate is disposed at only one side of the spool.

13. A webbing retractor according to claim 12, wherein the lock plate is disposed at a side at which the lock wheel is disposed.

14. A webbing retractor comprising:

a spool which is tube-shaped and on which a webbing is taken-up and from which the webbing is pulled-out;

a lock tooth formed at a surface, which intersects a rotation shaft of the spool, of a frame which is fixed and held at a vehicle and which rotatably supports both ends of the spool;

a lock plate formed so as to be engageable with the lock tooth and connected to the spool so as to be freely swingable, and when the spool is rotated in a webbing pull-out direction from a position at which the lock plate can engage with the lock tooth, the lock plate is guided by the lock tooth and moved toward a tooth bottom of the lock tooth and engages with the lock tooth, such that the lock plate impedes rotation of the spool in the webbing pull-out direction;

a lock wheel formed in a disc-shape and provided coaxially with the spool at one end side of the spool, the lock wheel usually rotating integrally with the spool and holding the lock plate at a position of non-engagement with the lock tooth, and when relative rotation arises between the lock wheel and the spool, the lock wheel guides the lock plate to a position at which engagement with the lock tooth is possible, and as the lock plate moves toward the tooth bottom of the lock tooth, the lock wheel is rotated in a webbing take-up direction; and a lock operation device having a pawl which is swingably supported and an engagement tooth which can engage with the pawl, the pawl usually being held at a position of non-engagement with the engagement tooth, and in a predetermined case, due to the pawl swinging and engaging wit h the engagement tooth, rotation of the lock wheel in the webbing pull-out direction is impeded, and due to the lock wheel being rotated in the webbing take-up direction, an engaged state of the pawl and the engagement tooth is cancelled, wherein a region of engagement of the pawl with the engagement tooth is formed so as to correspond to a locus of swinging of the pawl.

15. A webbing retractor according to claim 14, wherein the engagement tooth of the lock operation device is formed at an inner peripheral surface of a tube-shaped member which is fixedly provided at the frame, and in a state in which the pawl of the lock operation device is accommodated within the tube-shaped member, the pawl is supported at the lock wheel so as to be freely swingable around a shaft which is parallel to the rotation shaft of the spool, and the pawl is connected to one end portion of an elastic body whose other end portion is connected to the lock wheel, and usually, the pawl is urged in a direction of non-engagement with the engagement tooth by urging force of the elastic body, and at a time when the webbing is rapidly pulled-out, the pawl swings in a direction of engaging with the engagement tooth against the urging force of the elastic body, and due to the lock wheel being rotated in the webbing take-up direction, the pawl separates from the engagement tooth and returns to a position of non-engagement with the engagement tooth due to the urging force of the elastic body.

16. A webbing retractor according to claim 15, wherein the region of engagement of the pawl is formed as a circular arc of a radius which is smaller than a radius of swinging of the pawl.

17. A webbing retractor according to claim 14, wherein the region of engagement of the pawl is formed as a circular arc of a radius which is smaller than a radius of swinging of the pawl.

18. A webbing retractor comprising:

a spool which is tube-shaped and on which a webbing is taken-up and from which the webbing is pulled-out;

a lock tooth formed at a surface, which intersects a rotation shaft of the spool, of a frame which is fixed and held at a vehicle and which rotatably supports both ends of the spool;

a lock plate formed so as to be engageable with the lock tooth and connected to the spool so as to be freely swingable, and when the spool is rotated in a webbing pull-out direction from a position at which the lock plate can engage with the lock tooth, the lock plate is guided by the lock tooth and moved toward a tooth bottom of the lock tooth and engages with the lock tooth, such that the lock plate impedes rotation of the spool in the webbing pull-out direction;

a lock wheel formed in a disc-shape and provided coaxially with the spool at one end side of the spool, the lock wheel usually rotating integrally with the spool and holding the lock plate at a position of non-engagement with the lock tooth, and when relative rotation arises between the lock wheel and the spool, the lock wheel guides the lock plate to a position at which engagement with the lock tooth is possible, and as the lock plate moves toward the tooth bottom of the lock tooth, the lock wheel is rotated in a webbing take-up direction; and a lock operation device having a pawl which is swingably supported and an engagement tooth which can engage with the pawl, the pawl usually being held at a position of non-engagement with the engagement tooth, and in a predetermined case, due to the pawl swinging and engaging with the engagement tooth, rotation of the lock wheel in the webbing pull-out direction is impeded, and due to the lock wheel being rotated in the webbing take-up direction, an engaged state of the pawl and the engagement tooth is cancelled, wherein the lock operation device has at least one sensor for operation control, and an engagement surface of the engagement tooth, which engagement surface engages with the pawl, is formed in a circular arc shape corresponding to a locus of swinging of a region at which the pawl engages the engagement tooth.

19. A webbing retractor according to claim 18, wherein the engagement tooth of the lock operation device is formed at an inner peripheral surface of a tube-shaped member which is fixedly provided at the frame, and in a state in which the pawl of the lock operation device is accommodated within the tube-shaped member, the pawl is supported at the lock wheel so as to be freely swingable around a shaft which is parallel to the rotation shaft of the spool, and the pawl is connected to one end portion of an elastic body whose other end portion is connected to the lock wheel, and usually, the pawl is urged in a direction of non-engagement with the engagement tooth by urging force of the elastic body, and at a time when the webbing is rapidly pulled-out, the pawl swings in a direction of engaging with the engagement tooth against the urging force of the elastic body, and due to the lock wheel being rotated in the webbing take-up direction, the pawl separates from the engagement tooth and returns to a position of non-engagement with the engagement tooth due to the urging force of the elastic body.

20. A webbing retractor according to claim 19, wherein the sensor is a webbing sensor, and the webbing sensor is accommodated within a holder which is provided at an outer side of one leg piece of the frame.

* * * * *